US011861664B2

(12) United States Patent
Basu et al.

(10) Patent No.: US 11,861,664 B2
(45) Date of Patent: *Jan. 2, 2024

(54) KEYWORD BIDS DETERMINED FROM SPARSE DATA

(71) Applicant: Adobe Inc., San Jose, CA (US)

(72) Inventors: Anirban Basu, Bengaluru (IN); Tathagata Sengupta, Bangalore (IN); Kunal Kumar Jain, Chennai (IN); Ashish Kumar, Bangalore (IN)

(73) Assignee: Adobe Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/955,781

(22) Filed: Sep. 29, 2022

(65) Prior Publication Data

US 2023/0021653 A1 Jan. 26, 2023

Related U.S. Application Data

(63) Continuation of application No. 16/555,380, filed on Aug. 29, 2019, now Pat. No. 11,494,810.

(51) Int. Cl.
*G06Q 30/00* (2023.01)
*G06Q 30/0273* (2023.01)
*G06F 16/9038* (2019.01)

(52) U.S. Cl.
CPC ..... *G06Q 30/0275* (2013.01); *G06F 16/9038* (2019.01)

(58) Field of Classification Search
CPC ............ G06Q 30/0275; G06F 16/9038
See application file for complete search history.

(56) References Cited

U.S. PATENT DOCUMENTS

| 11,494,810 B2 | 11/2022 | Basu et al. |
| 2010/0318568 A1 | 12/2010 | Tang et al. |
| 2011/0145058 A1 | 6/2011 | Liu et al. |

(Continued)

OTHER PUBLICATIONS

"Final Office Action", U.S. Appl. No. 16/555,380, dated Sep. 10, 2021, 8 pages.

(Continued)

*Primary Examiner* — Meredith A Long
(74) *Attorney, Agent, or Firm* — FIG. 1 Patents

(57) ABSTRACT

Keyword bids determined from sparse data are described. Initially, a portfolio optimization platform identifies which keywords included in a portfolio of keywords are low-impression keywords. This platform trains a machine learning model to generate bids for the low-impression keywords with historical data from a search engine. In particular, the platform trains this machine learning model according to an algorithm suited for training with sparse amounts of data, e.g., a temporal difference learning algorithm. In contrast, the platform uses different models, trained according to different algorithms than the low-impression keyword model, to generate bids for keywords determined not to be low-impression keywords. Once the low-impression keyword model is trained offline, the platform deploys the model for use online to generate actual bids for the low-impression keywords and submits them to the search engine. The platform continues to update the low-impression keyword model while deployed according to the sparse-data algorithm.

20 Claims, 7 Drawing Sheets

(56) References Cited

U.S. PATENT DOCUMENTS

| | | |
|---|---|---|
| 2015/0227964 A1 | 8/2015 | Yan et al. |
| 2017/0098239 A1 | 4/2017 | Yan et al. |
| 2017/0262899 A1 | 9/2017 | Geraghty et al. |
| 2017/0358000 A1 | 12/2017 | Jain et al. |
| 2018/0075475 A1 | 3/2018 | Pai et al. |
| 2018/0268444 A1 | 9/2018 | Dong et al. |
| 2021/0004868 A1* | 1/2021 | Montgomery ..... G06Q 30/0277 |

OTHER PUBLICATIONS

"Non-Final Office Action", U.S. Appl. No. 16/555,380, dated Feb. 16, 2022, 10 pages.

"Non-Final Office Action", U.S. Appl. No. 16/555,380, dated Apr. 12, 2021, 8 pages.

U.S. Appl. No. 16/555,380, "Notice of Allowance", U.S. Appl. No. 16/555,380, dated Jul. 6, 2022, 8 pages.

Cai, Han, et al., "Real-Time Bidding by Reinforcement Learning in Display Advertising", arXiv Preprint, Cornell University, arXiv.org [retrieved Apr. 12, 2021]. Retrieved from the Internet <, Jan. 12, 2017, 10 pages.

Chavez, Anthony, "Get More Powerful Bid Automation with New AdWords Smart Bidding", Jul. 25, 2016, 7 pages.

Ren, Kan, et al., "Bidding Machine: Learning to Bid for Directly Optimizing Profits in Display Advertising", arXiv Preprint, Cornell University, arXiv.org [retrieved Apr. 12, 2021]. Retrieved from the Internet <http://arxiv.org/pdf/1803.02194.pdf>., Mar. 11, 2018, 18 pages.

Schulman, John, "High-Dimensional Continuous Control Using Generalized Advantage Estimation", Oct. 20, 2018, 14 pages.

Zhao, Jun, et al., "Deep Reinforcement Learning for Sponsored Search Real-time Bidding", Mar. 1, 2018, 9 pages.

* cited by examiner

500 ⟶

502
Receive, from a search engine platform, data describing events associated with bidding a portfolio of keywords, the events including at least bids won for the keywords and user interaction with respective digital content exposed in connection with the bids won

↓

504
Generate a search engine simulator based on the received data to simulate behavior of the search engine platform by predicting whether training keyword bids submitted to the search engine simulator win and predicting user interaction with the respective digital content specified for exposure in connection with the bids won

↓

506
Determine which of the keywords of the portfolio are low-impression keywords based on a comparison of an amount of user interaction with the respective digital content to an interaction threshold

↓

508
Train a low-impression keyword model (LIK model) offline based on:
(1) training data that combines the received data describing the events associated with bidding the low-impression keywords with semantic data for the low-impression keywords, and
(2) predictions generated by the search engine simulator responsive to receipt of the training keyword bids produced by the LIK model based on the training data

↓

510
Deploy the trained LIK model as trained to generate keyword bids for the low-impression keywords and submission to the search engine platform

*Fig. 5*

KEYWORD BIDS DETERMINED FROM SPARSE DATA

RELATED APPLICATION

This application is a continuation of and claims priority to U.S. patent application Ser. No. 16/555,380, filed Aug. 29, 2019, entitled "Keyword Bids Determined from Sparse Data", the entire disclosure of which is hereby incorporated by reference herein in its entirety.

BACKGROUND

Search engine platforms assist device users with locating information by exposing interfaces for obtaining search queries from these users and, for obtained search queries, searching the ever growing number of available sources (e.g., billions of web pages) to identify the sources that include information relevant to a respective search query. Search engine platforms then generally generate search results that include a listing of identified sources and return these search results to the respective devices. The order in which these identified sources are positioned in the listing, and even the presence of an identified source in the listing at all, has become an opportunity for service providers that deploy search engine platforms to generate revenue. In particular, the service providers generate revenue by selling positioning (e.g., a first source listed in search results) and/or presence within these listings. Broadly speaking, service providers sell this positioning and/or presence in relation to keywords, such that when a particular keyword is included in a search query the search engine platform can configure the search-result listing to include a source specified by an entity paying for the particular keyword.

In practice, search engine platforms provide interfaces that allow entities desiring exposure of their specified sources, in connection with a particular keyword, to submit bids for the keyword. The highest of these bids "wins" the positioning and/or presence in the search-result listing for the particular keyword, such that a source specified by the highest bidding entity is included in the listing and sources of other entities are not included or are included at inferior positions. The positioning and presence opportunities that search engine platforms make available for this bidding are generally referred to as "impressions." Entities thus bid on keywords via the search engine platforms' keyword interfaces to win these impressions. The entities bidding on these keywords generally have limited budgets for spending on impressions and they also attempt to optimize some reward that is obtained by exposing their specified sources via the impressions.

Determining how much to bid on keywords in order to optimize a reward over a period of time given a budget and competitive bids of others is no trivial task, however. Due at least to the sheer volume of data considered (e.g., remaining budget, amount of winning bids, amounts of future reward from bids if any, end user behavior in relation to an exposed source, number of times a keyword is included in search queries, and so on) as well as uncertainty regarding how much others bid for keywords and when keywords are included in search queries, it is practically impossible for humans to make such determinations in a way that actually optimizes reward. Consequently, systems have been developed that generate bids for keywords in real-time using vast amounts of data in order to optimize a reward and that do not rely on human interaction.

Conventional systems deploy machine learning models trained to optimize bidding decisions (e.g., bid amounts and sequences of bids) for a performance metric, such as clicks, cost, revenue, and so forth. Due to a relatively large amount of data describing bidding and user interaction for some keywords (e.g., brand and head keywords), these conventional systems are capable of accurately predicting behavior or search engine platforms and users in relation to those keywords—whether bids for those keywords will win and how end users will interact with digital content exposed to them as a result of winning—and generate bids accordingly. However, these conventional systems fail to accurately predict the behavior of search engine platforms and users in relation to keywords having sparse data describing bidding and user interaction. Indeed, the behavior observed in relation to keywords that are described only by sparse data is often erratic and generally unpredictable at the keyword level. By failing to accurately predict behavior relative to these sparsely described keywords, conventional systems generate suboptimal bids for such keywords and fail to optimize a reward for a portfolio of keywords.

SUMMARY

To overcome these problems, keyword bids determined from sparse data are leveraged in a digital medium environment. Initially, a portfolio optimization platform identifies which keywords included in a portfolio of keywords are low-impression keywords. For instance, the portfolio optimization platform compares user interaction with respective digital content to an interaction threshold, where the respective digital content was previously exposed to end users in connection with winning bids for the keywords at a search engine platform. In one example, keywords are identified as low-impression keywords when end users click on the respective exposed digital content fewer than 5 times in 30 days. Based on this identification, the portfolio optimization platform trains a machine learning model to generate bids for the low-impression keywords with historical data from the search engine platform. This historical data may describe, for instance, user interaction with the respective digital content along with bids won for the keywords.

In particular, the portfolio optimization platform trains this machine learning model according to an algorithm suited for training with a sparse amount of data, e.g., a temporal difference learning algorithm. By way of contrast, the portfolio optimization platform uses one or more different machine learning models, trained according to different algorithms than the low-impression keyword model, to generate bids for the keywords that are determined not to be low-impression keywords. Once the machine learning model for the low-impression keywords is trained offline, the portfolio optimization platform deploys the model for use online to generate actual bids for the low-impression keywords and also submits these bids to the search engine platform. The portfolio optimization platform continues to update the low-impression keyword model as it is used based on data describing outcomes of the submitted bids and according to the sparse-data algorithm.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 5 depicts a procedure in an example implementation in which the low-impression keyword model is trained with historical data.

DETAILED DESCRIPTION

Overview

Figure 1:
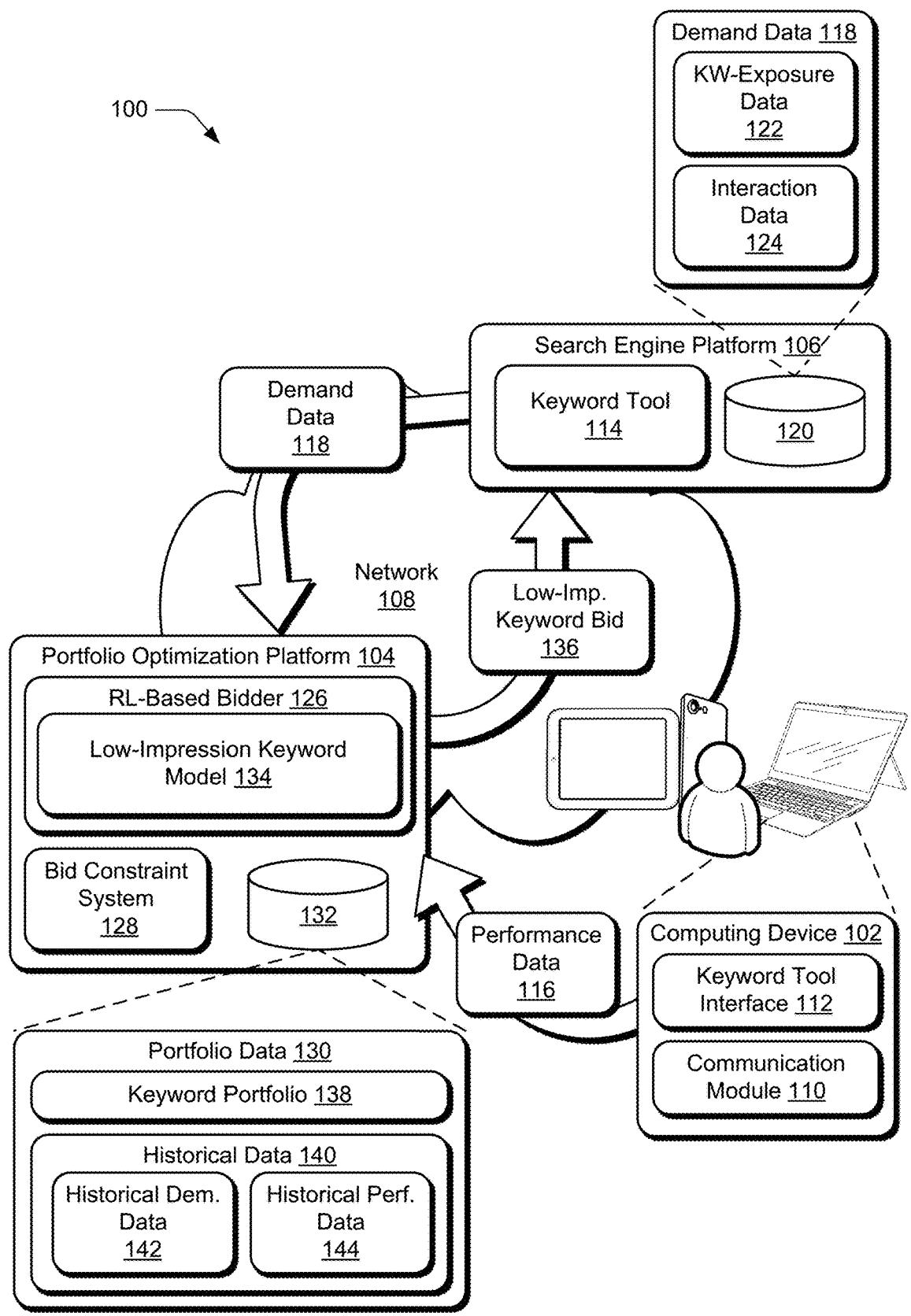
FIG. 1 is an illustration of an environment in an example implementation that is operable to employ techniques described herein.

Determining how much to bid on keywords at a search engine platform in order to optimize a reward over a period of time given a budget and competitive bids of others is no trivial task. Due at least to the sheer volume of data considered as well as uncertainty regarding how much others bid for keywords and when keywords are included in search queries, it is practically impossible for humans to make such determinations in a way that actually optimizes reward. Consequently, systems have been developed that generate bids for keywords in real-time for the purpose of optimizing a reward by using vast amounts of data and do not rely on human interaction. Conventional systems for generating such bids deploy machine learning models trained to optimize bidding decisions (e.g., bid amounts and sequences of bids) for separate performance metrics, such as by learning a model for clicks, a separate model for cost, a separate model for revenue, and so forth. However, these conventional systems fail to accurately predict the behavior of search engine platforms and users in relation to keywords for which there is sparse data describing bidding and user interaction.

To overcome these problems, keyword bids determined from sparse data are leveraged in a digital medium environment. Initially, a portfolio optimization platform identifies which keywords included in a portfolio of keywords are low-impression keywords. For instance, the portfolio optimization platform compares user interaction with respective digital content to an interaction threshold, where the respective digital content was previously exposed to end users in connection with winning bids for the keywords at a search engine platform. In one example, keywords are identified as low-impression keywords when end users click on the respective exposed digital content fewer than 5 times in 30 days. Data describing the keyword bidding, including whether bids for keywords win and user interaction with digital content exposed as a result of winning bids, is obtained from the search engine platform.

With this data, the portfolio optimization platform builds a search engine simulator and a model to generate bids for the low-impression keywords—not for other keywords of the portfolio. Rather, the portfolio optimization platform uses one or more models that are different from this low-impression keyword model to generate bids for the other keywords, e.g., for brand and head keywords. Broadly speaking, the search engine simulator is built to simulate behavior of the search engine platform in connection with keyword bidding. For example, the search engine simulator simulates behavior of the search engine platform by predicting whether bids submitted by the low-impression keyword model win impressions and also by predicting user interaction with respective digital content specified for exposure as a result of winning bids, e.g., predicting whether end users will click on the specified digital content if exposed to them.

The portfolio optimization platform trains the low-impression keyword model, in part, by monitoring bids generated by the model and simulated behavior of the search engine platform to these bids that is produced by the search engine simulator. Based on this monitoring, the portfolio optimization platform tunes parameters of the low-impression keyword model according to an algorithm suited for training with a sparse amount of data, e.g., a temporal difference learning algorithm. In one or more implementations, for instance, the low-impression keyword model is trained based on the Markov Decision Process using the temporal difference learning algorithm, as described in more detail below. In contrast to the conventional bidding systems which model the bid units for performance metrics separately, the portfolio optimization platform combines these metrics for low-impression keywords into a single state by representing the bid units as historical features of the state. In this way, a single state is configured to represent multiple bid units, e.g., all of mean bid, return on investment (ROI), cost-per-click (CPC), click through rate (CTR), clicks, impressions, and so forth. This approach leverages the underlying behavior of the low-impression keywords as a whole rather than in terms of the separate metrics, as is done conventionally for keywords.

Once the low-impression keyword model is suitably trained offline using the search engine simulator, the portfolio optimization platform deploys the model for use online, i.e., to generate actual bids for the low-impression keywords. In addition to leveraging the low-impression keyword model for bid generation, the portfolio optimization platform also includes a bid constraint system to constrain the model's bids based on a portion of a budget specifically allocated for the low-impression keywords. By way of example, the bid constraint system may adjust a maximum bid down or a maximum bid up based on an amount of the allocated budget spent over a previous time period, e.g., an amount spent over a last week. If spending across a previous week is relatively high, for instance, the bid constraint system can adjust the minimum and maximum bid bounds to control the bids the model is allowed to generate, so that the spending across a next week is relatively lower. The portfolio optimization platform then submits the constrained bids to the search engine platform.

The portfolio optimization platform receives data from the search engine platform describing outcomes of these bids and user interaction with digital content exposed responsive to the winning bids. The portfolio optimization platform continues to update the low-impression keyword model as it is used in real-time based on this data and according to the sparse-data algorithm, e.g., the temporal difference learning algorithm. For instance, the portfolio optimization platform tunes parameters of the model in real-time based on this data, such as a parameter that defines a number of days' worth of data used to generate the bids or a parameter that defines a learning rate for updating the model using the data. The low-impression keyword model generates subsequent bids for the low-impression keywords as it is updated, e.g., with the tuned parameters. It is to be appreciated that the portfolio optimization platform updates the low-impression keyword model iteratively and in real time as the bids are submitted to the search engine platform and data describing outcomes of those bids is received.

By creating and training a model specifically for low-impression keywords separately from models for other keywords of a portfolio, the portfolio optimization platform is able to more accurately model behaviors associated with the low-impression keywords than techniques that do not separately address the low-impression keywords. Additionally, by combining performance metrics into a single state representation, the portfolio optimization platform more accurately models underlying behavior of the low-impression keywords in a way that is not possible by modeling the metrics for these keywords separately, as in conventional approaches. This is because the data for the low-impression keywords is too sparse to accurately model behavior in terms of the performance metrics separately. Due to this improved modeling for low-impression keywords and dynamically adjusting constraints on bids generated by a low-impression keyword model, the portfolio optimization platform is able to improve measured performance of keyword portfolios relative to conventional systems.

Term Descriptions

As used herein, the term "impression" refers to an opportunity for position and/or presence in a search-result listing for a particular keyword and which search engine platforms make available for bidding, such that a source specified by the highest bidding entity is included in the listing and sources of other entities are not included or are included at inferior positions.

As used herein, the term "sparse" data refers to a relative amount of data that has been collected describing a given scenario, such as data describing keywords that have been bid upon, whether the bids for those keywords have won impressions, interaction with digital content exposed to users as a result of winning a bid, and so on. Behavior observed in relation to keywords that are described only by sparse data is often erratic and generally unpredictable at the keyword level.

As used herein, the term "low-impression" keyword refers to a keyword for which there is, according to collected data, less interaction than a threshold amount of interaction over a predetermined period of time. In one example, a low-impression keyword may be identified when end users click on the respective exposed digital content—as a result of winning bids for impressions corresponding to the keyword—fewer than 5 times in 30 days. It should be appreciated that different thresholds (e.g., different numbers of clicks and/or different numbers of days) may be used without departing from the spirit or scope of the described techniques. It should also be appreciated that different metrics may be used to identify low-impression keywords, such as number of winning bids over a predetermined period of time.

As used herein, the term "offline" training refers to training of a machine learning model using training data before the model is deployed to perform the actual task for which it has been created and trained. By way of contrast, the term "online" refers to use and training (e.g., updating) of a machine learning model while it is deployed to perform the actual task for which it has been created and trained. In the context of the described systems, a machine model is "online" while it is being used to submit actual bids to a search engine platform and is "offline" while it is being used to submit training bids to a search engine simulator during training.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ keyword bids determined from sparse data as described herein. The illustrated environment 100 includes computing device 102, portfolio optimization platform 104, and search engine platform 106 that are communicatively coupled, one to another, via a network 108.

Devices that are usable to implement the computing device 102, the portfolio optimization platform 104, and the search engine platform 106 may be configured in a variety of ways. These devices, for instance, may be configured as a desktop computer, a laptop computer, a mobile device (e.g., assuming a handheld configuration such as a tablet or mobile phone), and so forth. Thus, the device may range from full resource devices with substantial memory and processor resources (e.g., personal computers, game consoles) to low-resource devices with limited memory and/or processing resources. Additionally, a device may be representative of a plurality of different devices, such as multiple servers utilized by a business to perform operations "over the cloud" as further described in relation to FIG. 7.

In the illustrated example, the computing device 102 is depicted having a communication module 110, which supports communication by the computing device 102 of information to and receipt of information from other devices such as service provider systems. In relation to the illustrated environment 100, the communication module 110 enables the computing device 102 to send information to and receive information from the portfolio optimization platform 104 and the search engine platform 106.

On behalf of keyword tool interface 112, for instance, the communication module 110 can communicate data to the search engine platform 106 to interact with keyword tool 114. By way of example, the communication module 110 can communicate data to the search engine platform 106 to set up keyword bidding via the keyword tool 114, such as data describing keywords to bid on, manually specified bid amounts, a bidding model to be used (e.g., cost per click or cost per thousand impressions ("CPM")), budget information, a duration of bidding (e.g., start time of bidding, a stop time of bidding, and so on), and so forth. To this end, the keyword tool 114 is configured to enable users to set up and manage keyword bidding via a corresponding search engine. Indeed, different search engine platforms may have different keyword tools that enable users to set up and manage keyword bidding in connection with corresponding search engines, e.g., Google®, Bing®, and so on. It is to be appreciated that a variety of service providers, such as social networking service providers and e-commerce platforms (e.g., Facebook®, Amazon®, and so on), may also include respective keyword tools to implement keyword bidding in connection with search functionality. Accordingly, the illustrated search engine platform 106 may represent both search engine platforms and other types of service providers in the spirit and scope of the described techniques.

The communication module 110 can also communicate performance data 116 to the portfolio optimization platform 104 in connection with keyword bidding. As used herein, the performance data 116 describes performance of a given set of keywords, e.g., a portfolio, one or more campaigns, one or more keyword groups, one or more keywords. The performance data 116 may describe performance in terms of revenue generated through the keyword bidding, revenue per click, return on investment (ROI), and so forth. The performance data 116 may describe performance in other ways without departing from the spirit or scope of the described techniques.

In addition to receiving the performance data 116 from the computing device 102, the portfolio optimization platform 104 receives demand data 118 from the search engine platform 106. To the extent that keyword bidding may be implemented across multiple search engine platforms and/or service providers, the portfolio optimization platform 104 may receive the demand data 118 from multiple such sources. In the illustrated environment 100, the demand data 118 is depicted being communicated to the portfolio optimization platform 104 via the network 108 and also being stored in storage 120. The demand data 118 communicated over the network 108 represents a portion of the demand data 118 from the storage 120, such as a portion requested by the portfolio optimization platform 104 to produce keyword bids from sparse data for a particular keyword portfolio, e.g., a keyword portfolio associated with a user of the computing device 102.

In one or more implementations, the demand data 118 includes keyword exposure data 122 and interaction data 124. The keyword exposure data 122 describes characteristics related to exposing keyword digital content to end users, such as a number of impressions bid on for various keywords, bid amounts, a number of bids won (i.e., a bid won refers to a bid for a particular keyword being selected for an impression and respective digital content for the particular keyword being exposed to an end user via the impression), numbers of impressions for keywords, and so forth. In contrast, the interaction data 124 describes interactions of end users with exposed keyword digital content (i.e., exposed via impressions), such as numbers of clicks, click through rate ("CTR"), cost per click ("CPC"), conversions, and so forth. The interaction data 124 may describe other interactions of end users with this exposed digital content without departing from the described techniques. The demand data 118 may include the illustrated data (e.g., the keyword exposure data 122 and the interaction data 124) and/or various other data without departing from the spirit or scope of the techniques described herein.

In the illustrated example, the portfolio optimization platform 104 includes a reinforcement learning based bidder 126 ("RL-based bidder 126"), a bid constraint system 128, and portfolio data 130 which is illustrated in storage 132. The RL-based bidder 126 is depicted with low-impression keyword model 134. As discussed above and below, the described systems initially determine whether keywords of a portfolio are low-impression keywords or not. For example, if the search engine platform 106 identifies that there have been fewer than five clicks on digital content exposed for a given keyword over the past 30 days, then the keyword may be considered a "low-impression" keyword.

In contrast to conventional approaches, the portfolio optimization platform 104 determines bids differently for low-impression keywords than for other keywords. In particular, the portfolio optimization platform 104 leverages one or more primary keyword models (not shown) to determine bids for keywords that are determined not to be low-impression keywords and also leverages the RL-based bidder 126 with the low-impression keyword model 134 to determine bids for keywords that are determined to be low-impression keywords. Primary keyword models and the low-impression keyword model 134 are implemented according to different algorithms. This is because the amount of data describing the low-impression keywords is sparse and the behavior of those keywords is generally erratic, such that the bidding strategies learned for primary models often fail to achieve optimal performance for low-impression keywords. Details of the low-impression keyword model 134 are described further below.

The bid constraint system 128 constrains bids generated by the low-impression keyword model 134. In particular, the bid constraint system 128 may use data describing a user's budget (e.g., from the computing device 102) to determine minimum and maximum limits for individual keyword bids generated using the low-impression keyword model 134. As the low-impression keyword model 134 outputs predictions of bids, for instance, the bid constraint system 128 may provide feedback to the low-impression keyword model 134, e.g., by adjusting one or more parameters of the model. Low-impression keyword bid 136 represents a bid for a low-impression keyword and that has been generated using the functionality of the low-impression keyword model 134 and constrained using the bid constraint system 128.

In the illustrated environment 100, the portfolio data 130 includes keyword portfolio 138 and historical data 140, which is depicted having historical demand data 142 and historical performance data 144. The portfolio data 130 describes a given keyword portfolio. In accordance with the described techniques, the portfolio data 130 may include a multitude of keyword portfolios 138, e.g., keyword portfolios for many different clients that leverage the portfolio optimization platform 104. To this end, the portfolio data 130 may also include matching historical data 140 for such a multitude of keyword portfolios 138. In this way, each keyword portfolio 138 may have respective historical data 140.

In any case, the keyword portfolio 138 may include a variety of data describing the portfolio, such as a portfolio identifier, users associated with the portfolio, roles of the users (e.g., view only, manage and view, and so on), keywords of the portfolio, whether a user has selected to optimize bidding for low-impression keywords, an amount of budget to allocate for low-impression keywords, search engines where bids are being placed for the keywords (and which of the keywords), other service providers where the bids are being placed, and so forth.

In general, the portfolio optimization platform 104 uses the historical data 140 to determine which keywords in a portfolio are low-impression keywords and also to train the low-impression keyword model 134. The historical data 140 is used to train the low-impression keyword model 134 "offline," for instance, before the low-impression keyword model 134 is used to place actual low-impression keyword bids 136 at the search engine platform 106. By way of contrast, the demand data 118 and the performance data 116 may be used as it is received in real-time to update the low-impression keyword model 134 once the model is deployed to make actual bids. The historical demand data 142 and the historical performance data 144 may correspond to some previous time period's worth of the demand data 118 and the performance data 116, such as the previous 30 days' worth of the demand data 118 and the performance data 116.

Having considered an example environment, consider now a discussion of some example details of the techniques for keyword bids determined from sparse data in a digital medium environment in accordance with one or more implementations.

Keyword Bids Determined from Sparse Data

Figure 2:
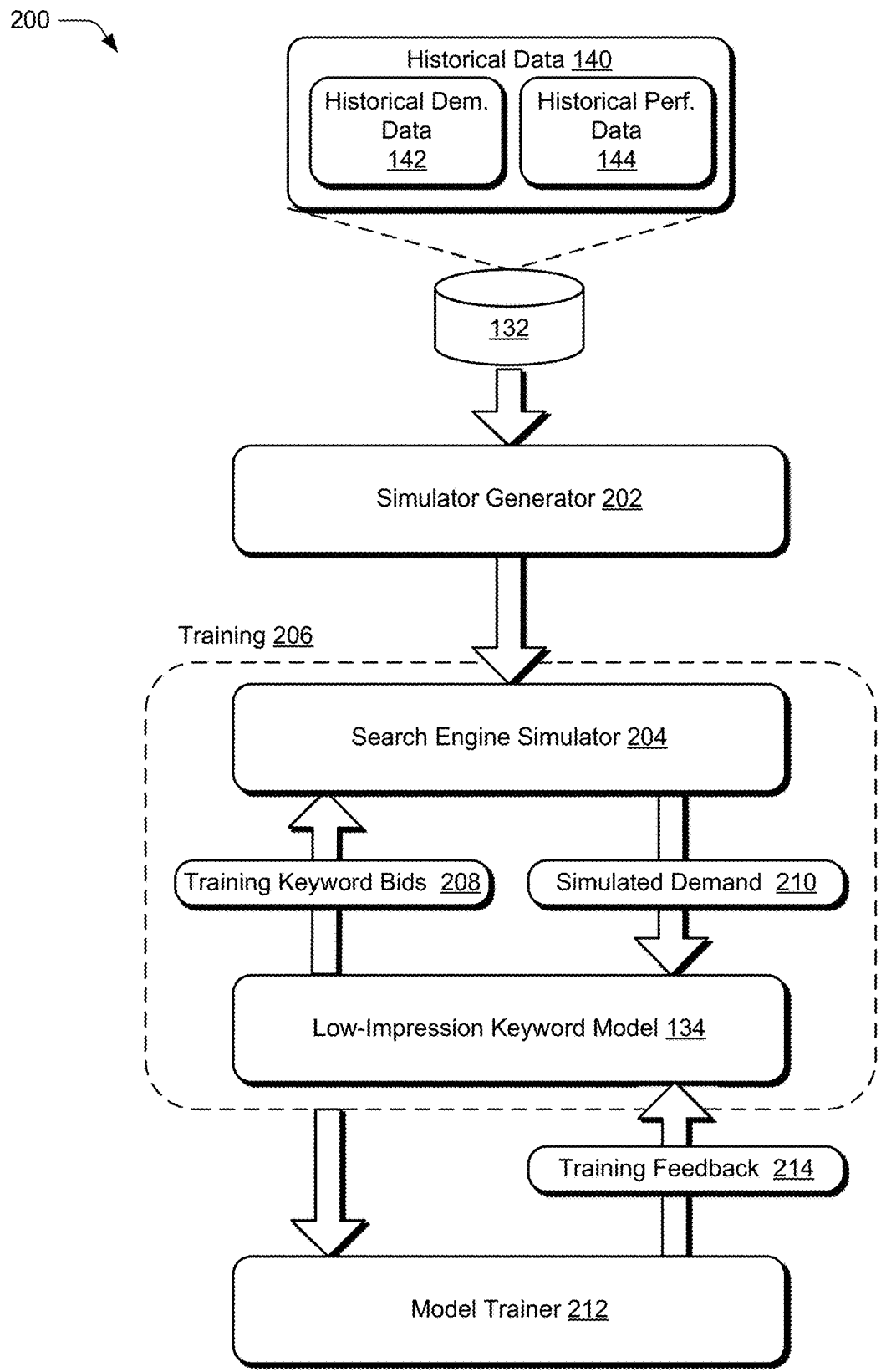
FIG. 2 depicts an example implementation in which the portfolio optimization platform of FIG. 1 trains a low-impression keyword model with historical data.

FIG. 2 depicts an example implementation 200 in which the portfolio optimization platform of FIG. 1 trains a low-impression keyword model with historical data. The illustrated example 200 includes from FIG. 1 the historical data 140 included in the storage 132 and also includes the low-impression keyword model 134.

A simulator generator 202 is depicted obtaining the historical data 140 as input and outputting a search engine simulator 204. Broadly speaking, the simulator generator 202 generates the search engine simulator 204 based on the historical data 140 to simulate the actual behavior of the search engine platform 106 in relation to keyword bidding, keyword digital content exposure, and user interaction with exposed digital content. By way of example, the search engine simulator 204 is configured to receive keyword bids for impressions (e.g., from the low-impression keyword model 134), determine which of the received bids "win" impressions (e.g., such that the respective keyword digital content is exposed), and generate data describing user interaction with the exposed digital content (e.g., whether users clicked on digital content exposed for keywords of the winning bids).

Generally, the search engine simulator 204 is used for training 206 the low-impression keyword model 134. With the above-noted capabilities, the search engine simulator 204 is used to train the low-impression keyword model 134 "offline," i.e., without submitting actual bids generated by the low-impression keyword model 134 to the search engine platform 106. In this way, the low-impression keyword model 134 may be tuned without its bids generated during the training 206 resulting in payment of the corresponding bid amount to the search engine platform 106. By allowing the low-impression keyword model 134 to generate hundreds, thousands, or even millions of bids without financial consequence—in terms of having to actually pay for bids submitted to the search engine platform 106—the training 206 can be carried out over a number of iterations that is suitable to enable the low-impression keyword model 134 to encode a bidding strategy optimized for achieving some objective, e.g. maximize revenue of low-impression keywords of a given keyword portfolio.

During the training 206, the low-impression keyword model 134 submits training keyword bids 208 to the search engine simulator 204. The search engine simulator 204 receives the training keyword bids 208, predicts which of these bids "win" impressions to expose corresponding keyword digital content, and predicts user interaction with exposed keyword digital content. Simulated demand 210 describes which of the training keyword bids 208 win impressions during the training 206 and also the user interaction with exposed keyword digital content corresponding to the winning bids.

Model trainer 212 manages the training 206, including monitoring the training 206 and providing training feedback 214 based on the monitoring. By way of example, the model trainer 212 may monitor the training keyword bids 208 and the simulated demand 210 and then determine to adjust parameters of the low-impression keyword model 134 based on these bids and simulated demand. For instance, the model trainer 212 can determine to adjust the low-impression keyword model 134's parameters to optimize the model's bidding strategy, e.g., to maximize revenue for low-impression keywords. In this example, the training feedback 214 may thus include data and/or instructions that adjust the parameters of the low-impression keyword model 134. In one or more implementations, the model trainer 212 trains the low-impression keyword model 134 in accordance with the following discussion.

In general, the RL-based bidder 126 with the low-impression keyword model 134 is configured to handle bidding for keywords for which there is not enough data to build "confident" models, such as the primary keyword models mentioned above. Rather, the data on which the low-impression keyword model 134 is based has relatively high variance in comparison with the data used to build the primary keyword models. Additionally, there are not enough data points in the data on which the low-impression keyword model 134 is based to identify model parameters to fit the training data, i.e., the historical data 140. Due to these issues, the model trainer 212 may train the low-impression keyword model 134 according to a Markov Decision Process. It is to be appreciated, however, that the model trainer 212 may train the low-impression keyword model 134 in other ways without departing from the spirit or scope of the described techniques.

In the following discussion, the term s represents a state that corresponds to a combination of historical features and semantic features, the term a represents an action, e.g., an amount to increase or decrease a next bid, and the term R(s, a) represents a reward for taking the action a given the state s. In one or more implementations, the state s may be represented according to the following expression:

$$s = [\text{historical data features}] + [\text{semantic features}]$$

During the training 206, the RL-based bidder 126 extracts or otherwise determines these historical data features from the historical data 140. By way of example, the historical data features may include a mean bid, return on investment (ROI), cost-per-click (CPC), click-through-rate (CTR), number of clicks, and number of impressions. The RL-based bidder 126 determines these features for a previous 'n' days, such that 'n' corresponds to a hyperparameter of the model and is bound by a defined range of days. For instance, 'n' may range from 1 to 15 days. In one or more implementations, the RL-based bidder 126 discretizes each of the above noted features, e.g., each of the mean bid, ROI, CPC, CTR, clicks, and impressions. To the extent that a state s can be defined by buckets of [bid, ROI, CPC, CTR, clicks, impressions], one state can have multiple bid units. In at least one example, the RL-based bidder 126 is configured to apply a same action—a delta bid up or delta bid down—to all bid units belonging to a same state. Applying a same action to all bid units of the state may result in bid units moving to different states—as the rewards will be different for each exposed item of keyword digital content. Accordingly, the problem of determining how much to bid for impressions given the states and actions is stochastic.

As noted above, a state s also includes semantic features. By way of example, these semantic features include word embeddings of the keywords and campaign names to capture semantic similarity. By capturing semantic similarity in the states, learned behavior of a search provider and of users may be transferred across semantically similar keywords. For keywords where the historical data 140 is sparse, for instance, these semantic features enable the RL-based bidder 126 to assign keywords to similar states and the low-impression keyword model 134 to generate bids, e.g., the training keyword bids 208, accordingly.

In relation to the action term a, the low-impression keyword model 134 is used to determine whether to generate a fractional bid up or a fractional bid down for low-impression keywords. As mentioned above, in one or more implementations, all bid units belonging to a same state have a same action applied. Further, the action a, may correspond to a determined value—a multiplier that the RL-based bidder 126 applies to a current bid to compute a next bid. In one or more implementations, the action a may be bounded to control a maximum amount a bid can be decreased and a maximum amount a bid can be increased. In one implementation, for instance, a value of the action a may be bounded according to the following range [0.5, 2], indicating that a bid can be decreased at most to half of a current bid and increased at most to double the current bid. Consider an example in which an action of 0.8 is determined for a state s. In this example, a next bid is equal to a current bid multiplied by 0.8 (e.g., next_bid=current_bid×0.8) for all bid units currently in that state s.

In relation to the reward term R(s, a), in addition to representing a reward for taking the action a given the state s, the reward term also incorporates delayed rewards. This is because rewards are generally sparse at the keyword level for low-impression bid units but less sparse at the portfolio level, e.g., across all the low-impression keywords. As used herein, the term "episode" or "ep" refers to an episode for training the low-impression keyword model 134. In one or more implementations, the model trainer 212 uses a 30-day episode to train the low-impression keyword model 134. It is to be appreciated that episodes of other lengths may be used without departing from the spirit or scope of the described techniques. The term "state transition" refers to a change of a bid unit state given an action taken. Here, applying a same action may cause bid units to move to different states.

The model trainer 212 carries out the training 206 of the low-impression keyword model 134, generally, to determine a policy π(s), which maps each state s to an action a to maximize expected accumulated rewards. In one or more implementations, the model trainer 212 is configured to use a Q-value approach to determine the optimal policy π(s). For instance, the model trainer 212 may train the low-impression keyword model 134 to determine an optimal policy π(s) for a given state $s_t$, which may be expressed according to the following in at least one example:

$$\pi(s_t)=\mathrm{argmax}_a Q(s_t, a_t)$$

Here, the term $Q(s_t, a_t)$ represents a function to control a positive false discovery rate for a given state $s_t$ and a given action $a_t$. In one example, the model trainer 212 may use a positive false discovery rate expressed as follows for training the low-impression keyword model 134:

$$Q(s,a)=E[R|S=s,A=a]$$

Here, the term S represents a first vectorization of the states s, A represents a second vectorization of the actions a, and R represents a third vectorization of accumulated long term (e.g., cumulative) reward that the model trainer 212 is configured to maximize. In one example, the model trainer 212 may use the following expression for R in connection with training the low-impression keyword model 134:

$$R=\Sigma_{k=0}^{T-t} \gamma^k r(s_{t+k}, a_{t+k})$$

Here, the term γ represents a discount factor for delayed rewards, which discounts rewards obtained in the future due to certain bids more than rewards now are discounted. By determining an optimal Q-value for each state $s_t$ iteratively, the model trainer 212 trains the low-impression keyword model 134 to identify an optimized sequential decision, e.g., of actions to take in order and in terms of bid submissions.

As part of training the low-impression keyword model 134, the model trainer 212 may also use a temporal difference learning approach to tune the learning rate, represented by the term α. As noted above, the term γ represents the discount factor for delayed rewards. In one example, the model trainer 212 trains the low-impression keyword model 134 using the following temporal difference learning algorithm:

$$Q_t(s,a)=Q_{t-1}(s,a)+\alpha(R(s,a)+\gamma\,\mathrm{max}_{a'} Q_{t-1}(s',a')-Q_{t-1}(s,a))$$

In connection with this temporal difference learning algorithm, the model trainer 212 may determine the reward term R(s, a) as a function of return on investment (ROI) and cost-per-click (CPC), such that R(s, a)=f(ROI, CPC). Given this approach, the accumulated long term reward is substantially equal to an average of rewards achieved belonging to state s and responsive to applying action a. Moreover, a reward for one bid unit is equal to a first weight multiplied by the ROI and a second weight multiplied by the CPC, e.g., reward for 1 bid_unit=$w_1$×ROI+$w_2$×CPC. It follows too that a reward for one state is equal to a mean reward for all bid units belonging to that state of a training instance.

This temporal difference learning approach that is used by the model trainer 212 to train the low-impression keyword model 134 contrasts with learning that simply leverages the Bellman Equation. By way of contrast, the Q-value for a state s and action a is computed using the Bellman Equation in accordance with the following:

$$Q(s,a)=R(s,a)+\gamma\Sigma_s p(s'|s,a)V(s')$$

Here, the term V(s') represents negation of the state s. The value of a given state s may be computed according to the following:

$$V(s)=\mathrm{max}_a Q(s,a)$$

With the Bellman equation, a state's learned Q-values can be used to make a determination regarding adjusting bids in real time and also to provide feedback for updating learned Q-values with new data and rewards observed in live data. However, this approach has the disadvantage that it requires computation and storage of a probability p(s'|s, a) of a given keyword to transition from a state s given an action a to negation s' of the state. This computation is difficult in connection with low-impression keywords due to the dynamics and uncertainty in behavior of the low-impression keywords.

In contrast to requiring computation of the above-noted probability, use of the temporal difference learning approach involves storage of values just for Q(s, a). By using the temporal difference approach, a single state is capable of holding multiple bid units so that the low-impression keyword model 134 can bid (according to the action) using optimal Q-values for the given state. Responsive to submitting the training keyword bids 208, each bid unit has different feedback (e.g., a different reward). This reward is propagated to the state, as a feedback, to learn about a mean reward achieved due to the action taken in the state. The mean reward is used along with the state and the action to update the Q-value of the state, which is used subsequently for bidding in a next training iteration. The model trainer 212 is also used when the low-impression keyword model 134 is deployed to submit actual bids to the search engine platform 106. In other words, the model trainer 212 is also used when the low-impression keyword model 134 is "online" When the low-impression keyword model 134 is deployed, the model trainer 212 may continuously update the low-impression keyword model 134 using the temporal difference learning algorithm discussed above. In so doing, the model trainer 212 updates the low-impression keyword model 134 as live data—describing actual behavior of the search engine platform 106 and users in connection with keyword bidding and content exposure—is received. In the context of submitting actual keyword bids to the search engine platform 106 and updating the low-impression keyword model 134 as it is being used to submit actual bids to the search engine platform 106, consider FIG. 3.

Figure 3:
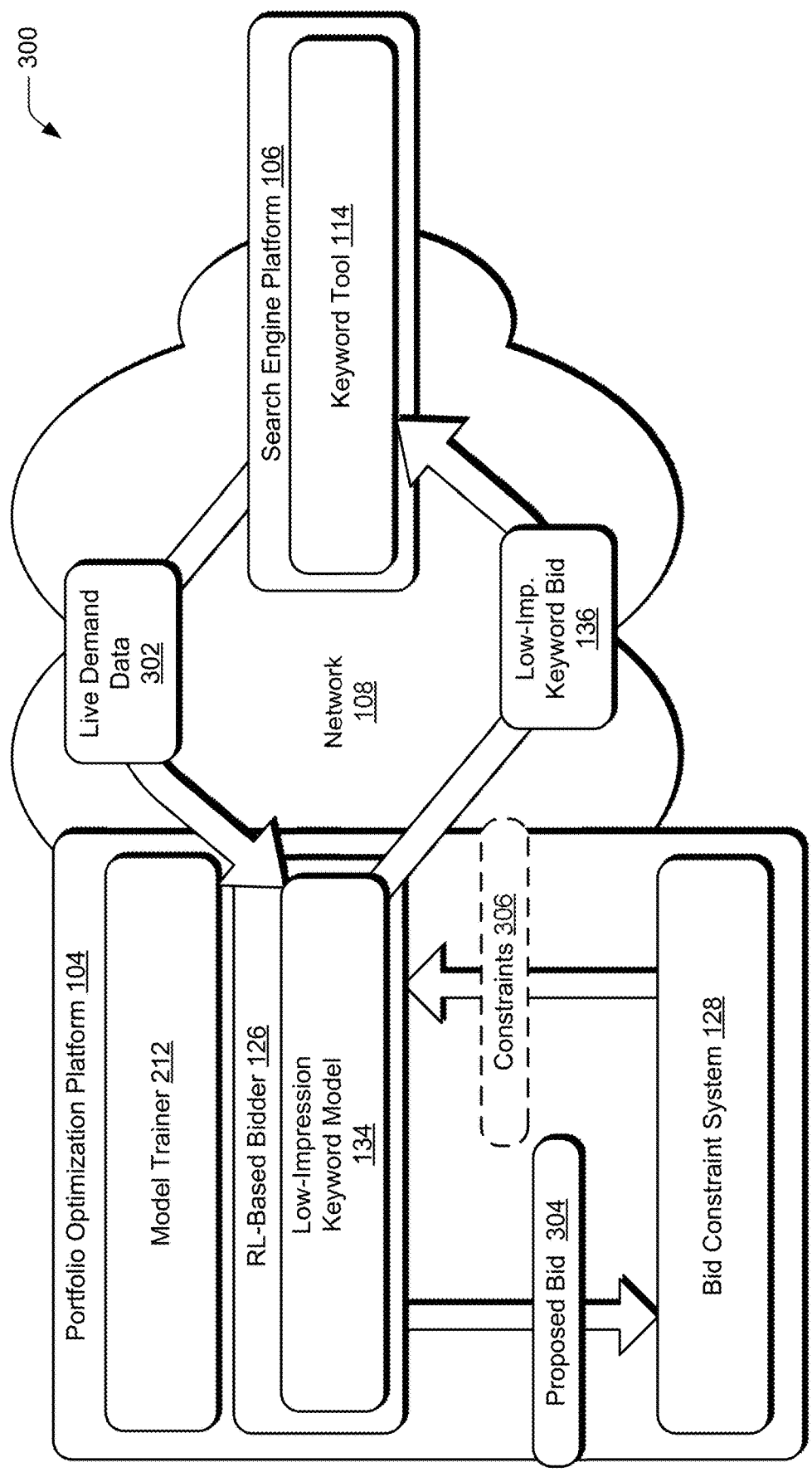
FIG. 3 depicts an example implementation in which the portfolio optimization platform of FIG. 1 deploys the low-impression keyword model and a bid constraint system to constrain keyword bids submitted to search engine platforms.

FIG. 3 depicts an example implementation 300 in which the portfolio optimization platform of FIG. 1 deploys the low-impression keyword model and a bid constraint system to constrain keyword bids submitted to search engine platforms.

The illustrated example 300 includes from FIG. 1, the portfolio optimization platform 104 having the RL-based bidder 126 with the low-impression keyword model 134 and also having the bid constraint system 128. In this example 300, the portfolio optimization platform 104 is also depicted with the bid constraint system 128 and the model trainer 212. Additionally, the illustrated example 300 includes the search engine platform 106 with the keyword tool 114.

As noted above, the model trainer 212 is configured to update the low-impression keyword model 134 as the model is used for bidding on keywords at the search engine platform 106, such as to continue training the low-impression keyword model 134 using the temporal difference learning algorithm described above. In contrast to the above-described offline training, however, the continued training is based on the actual low-impression keyword bids 136 submitted to the search engine platform 106 to purchase impressions for serving content to actual end users and also based on live demand data 302 received from the search engine platform 106, i.e., rather than based on the training keyword bids 208 submitted to the search engine simulator 204 and on the simulated demand 210 received from the search engine simulator 204.

The live demand data 302 describes, for instance, which of the low-impression keyword bids 136 win—such that corresponding digital content is exposed for a respective keyword via an impression—as well as user interaction with the respective exposed digital content, e.g., clicks, conversion, and so forth. The live demand data 302 is "live" insofar is it corresponds to the demand data 118 received after the low-impression keyword model 134 is deployed to submit the actual low-impression keyword bids 136 to the search engine platform 106. The live demand data 302 may describe a variety of aspects of keyword bidding and user interaction with exposed keyword digital content without departing from the spirit or scope of the described techniques.

In relation to the bid submission process, the illustrated example 300 also includes proposed bid 304 and constraints 306. In operation, the RL-based bidder 126 submits a proposed bid 304 for a low-impression keyword (or proposed bids 304 for multiple low-impression keywords) to the bid constraint system 128. The bid constraint system 128 then determines whether the proposed bid 304 satisfies one or more predefined constraints, e.g., falls within a predefined range of bids based on budget. If the proposed bid 304 does satisfy the predefined constraints, then the RL-based bidder 126 submits a low-impression keyword bid 136 to the search engine platform 106 that corresponds to the proposed bid 304. If the proposed bid 304 does not satisfy the predefined constraints, however, then the bid constraint system 128 provides the constraints 306 to the low-impression keyword model 134.

In one or more implementations, the provided constraints 306 are based on the predefined constraints, e.g., an acceptable bid range derived from a budget input by a user of the computing device 102. The model trainer 212 may use the provided constraints 306 to adjust one or more parameters of the low-impression keyword model 134 in real-time as bids are proposed. The model trainer 212 may adjust the parameters of the low-impression keyword model 134, for instance, each time a proposed bid 304 is submitted until a proposed bid 304 satisfies the predefined constraints. In one or more implementations, the proposed bids 304 may be constrained by the bid constraint system 128 to produce low-impression keyword bids 136 that have been constrained in accordance with the following discussion. It is to be appreciated, however, that the bid constraint system 128 may be configured to constrain the proposed bids 304 in other ways than discussed below without departing from the spirit or scope of the described techniques.

In one example, the bid constraint system 128 may be configured as a P-controller-based agent to tune hyperparameters of the low-impression keyword model 134. The bid constraint system 128 is configured to do so based on the live demand data 302 as the low-impression keyword model 134 is used in real-time for keyword bidding with the search engine platform 106. Broadly speaking, the bid constraint system 128 adjusts a maximum bid up and a maximum bid down. Consider again the example in which actions (e.g., bid up or bid down) are initially bounded by a range which limits the maximum bid up to double a current_bid and limits the maximum bid down to halving the current_bid—corresponding to a range of [0.5, 2]. In this example, the bid constraint system 128 is capable of adjusting one or more of the maximum bid up ('2') or maximum bid down ('0.5'), such as by changing the range to [0.4, 2], [0.5, 2.1], [0.01, 5], or a different range.

In one or more implementations, the bid constraint system 128 adjusts the maximum bid up and maximum bid down that are allowable for the RL-based bidder 126 on a daily basis. Certainly, the bid constraint system 128 may adjust the maximum bid up and maximum bid down that are allowable for the RL-based bidder 126 at different intervals, such as every 12 hours, every 6 hours, and so forth. In operation, the bid constraint system 128 controls spending on exposure of keyword digital content that is caused by bids of the low-impression keyword model 134. By way of example, if the mean spending across a previous week is relatively high, the bid constraint system 128 adjusts the minimum and maximum action bound so that the spending across a next week is relatively lower than the previous week. Similarly, if the mean spending across a previous week is relatively low, the bid constraint system 128 adjusts the minimum and maximum action bound so that the spending across a next week is relatively higher than the previous week.

The bid constraint system 128 is further configured to increase coverage of the low-impression keyword model 134, such as by tuning a hyperparameter representative of a previous 'n' days' worth of data that the low-impression keyword model 134 uses to classify bid units into different states. By adjusting this hyperparameter, the bid constraint system 128 can cause the low-impression keyword model 134 to be used to generate bids for an increased pool of bid units on a daily basis. By increasing the pool of bid units for which bids are generated on a daily basis, the bid constraint system 128 causes the low-impression keyword model 134 to have increased model coverage, which is effective to exploit a potential of all bid units more aggressively.

In one example, the bid constraint system 128 is configured to control the spending caused by bids of the low-impression keyword model 134 based on the following equation:

$$u(t) = u_{bias} + K_c \times (SP-PV) = u_{bias} + K_c \times e(t)$$

Here, the term $K_c$ represents a multiplier on error, such that a higher value causes the bid constraint system 128 to provide more aggressive constraints 306 when responding to errors away from a set point, represented by the term SP. Generally speaking, the set point SP represents a target value and the term PV represents a process variable, which corresponds to the measured value that may deviate from the target value. The bid constraint system 128 determines an error from the set point using the difference between the set point and the process variable, such that the error e(t)=SP−PV. In operation, the bid constraint system 128 determines the error e(t) based on data collected from the search engine platform 106 in connection with keyword bidding, such as based on average spending for a week and a current spend. To this end, the term s(t) represents average spending for a week and the term c(t) represents the current spend. Given this, the bid constraint system 128 determines the error e(t) in one example according to the following:

$$e(t) = s(t) - c(t)$$

Further, the bid constraint system 128 may determine values for the multiplier on error, K, with a standard set point tracking approach that leverages integral of time-weighted absolute error (ITAE) method with one or more approximations. According to this standard approach, the bid constraint system 128 may determine the multiplier on error, K, using the following:

$$K = \frac{0.20}{P}$$

Here, the term P represents a proportional term to remove gross error. Broadly speaking, it is the output of a P-controller. In one example, the bid constraint system 128 determines P according to the following equation:

$$P = \frac{c(t) - c(t-1)}{\alpha_t - \alpha_{t-1}}$$

Here, the term $\alpha_t$ again represents the learning rate parameter, which the bid constraint system 128 is also configured to tune each iteration (time) that it is leveraged to constrain the proposed bids 304. In one or more implementations, the bid constraint system 128 computes this parameter in accordance with the following example:

$$\alpha_t = \alpha_{t-1} + K \times e(t)$$

By using the constraints 306 to tune various parameters, e.g., n (number of days' worth of data to consider) and α (learning rate), of the low-impression keyword model 134, the bid constraint system 128 controls an amount spent in connection with keyword bidding at the search engine platform 106 using the RL-based bidder 126. In the context of enabling bidding for low-impression keyword bidding using the low-impression keyword model 134, consider FIG. 4.

Figure 4:
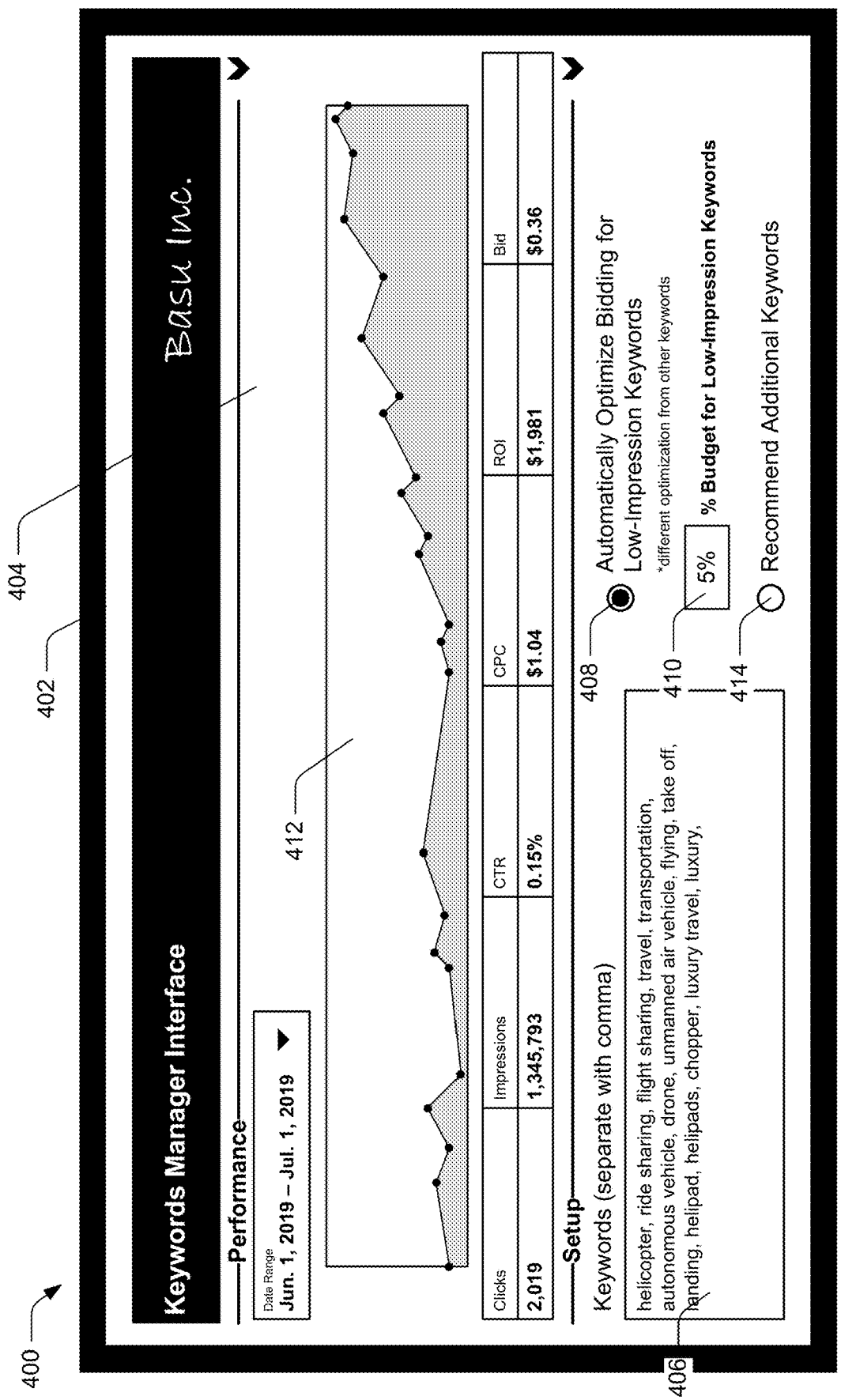
FIG. 4 depicts an example of a user interface having components that enable user entry of keywords and user selection of an option to optimize bidding for low-impression keywords differently from bidding for other keywords.

FIG. 4 depicts an example 400 of a user interface having components that enable user entry of keywords and user selection of an option to optimize bidding for low-impression keywords differently from bidding for other keywords.

The illustrated example 400 includes display device 402 displaying user interface 404. The user interface 404 may correspond to the keyword tool interface 112 in one or more examples. In the example 400, the user interface 404 includes keyword entry component 406 which enables a user to enter keywords. These represent the keywords for which bids are submitted on behalf of the user, such that if a bid wins then digital content specified by the user is served to an end user for a respective keyword. Although the keyword entry component 406 is depicted as a text entry box, a keyword entry component 406 may be configured in different ways without departing from the spirit or scope of the described techniques, such as by entry using a voice assistant device.

In the illustrated example 400, the user interface 404 also includes low-impression optimization option 408 and low-impression allocation component 410. The low-impression optimization option 408 is selectable to bid on low-impression keywords differently than other keywords, e.g., using the low-impression keyword model 134 and the bid constraint system 128 rather than using other types of models. Although the user interface 404 is depicted having the low-impression optimization option 408, it is to be appreciated that in one or more implementations such a user interface may not include such an option. Rather, low-impression keywords may automatically (without user interaction) be bid on differently (e.g., using the low-impression keyword model 134 and the bid constraint system 128) than other keywords. The low-impression allocation component 410 enables a user to enter an amount of a total budget, for bidding on keywords of a keyword portfolio, that is to be allocated to bidding on the portfolio's low-impression keywords. Although illustrated as a radio button and a text entry field, respectively, the low-impression optimization option 408 and the low-impression allocation component 410 may be implemented in different manners without departing from the spirit or scope of the described techniques, such as by using "skills" of a voice assistant device.

In the illustrated example 400, the user interface also includes performance report 412 and additional keyword recommendation option 414. A user interface to provide input for and receive reports describing keyword bidding using the RL-based bidder 126 may be configured in different ways than depicted and including different components without departing from the spirit or scope of the described techniques.

Having discussed example details of the techniques for keyword bids determined from sparse data, consider now some example procedures to illustrate additional aspects of the techniques.

Example Procedures

This section describes example procedures for keyword bids determined from sparse data in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the computing device 102, the portfolio optimization platform 104, and the search engine platform 106.

FIG. 5 depicts a procedure 500 in an example implementation in which the low-impression keyword model is trained with historical data.

Data is received that describes events associated with bidding a portfolio of keywords (block 502). In accordance with the principles discussed herein, the events include at least bids won for the keywords and user interaction with respective digital content exposed in connection with the bids won. By way of example, the portfolio optimization platform 104 receives the historical data 140 from at least one of the search engine platform 106 or the computing device 102.

A search engine simulator is generated based on the received data (block 504). In accordance with the principles discussed herein, the search engine simulator is configured to simulate behavior of the search engine platform by predicting whether training keyword bids submitted to the search engine simulator win and predicting user interaction with the respective digital content specified for exposure in connection with the bids won. By way of example, the simulator generator 202 generates the search engine simulator 204 based on the historical data 140.

Determinations are made regarding which of the keywords of the portfolio are low-impression keywords (block 506). In accordance with the principles discussed herein, these determinations are made based on a comparison of an amount of user interaction with the respective digital content exposed to an interaction threshold. By way of example, the portfolio optimization platform 104 determines which of the keywords of the keyword portfolio 138 are low-impression keywords, e.g., if digital content exposed for the keywords, responsive to winning bids, was clicked on less than 5 times during the previous 30 days.

A low-impression keyword model is trained offline (block 508). In accordance with the principles discussed herein, the training is based on training data that combines the received data, which describes the events associated with bidding the low-impression keywords, with semantic data for the low-impression keywords. The training is further based on predictions generated by the search engine simulator responsive to the training keyword bids that are produced by the low-impression keyword model and are based on the training data. By way of example, the model trainer 212 trains the low-impression keyword model 134 as discussed above in more detail, including based on training data created from the data received at block 502, the training keyword bids 208 submitted to the search engine simulator 204, and the simulated demand 210.

The trained low-impression keyword model is deployed to generate keyword bids for submission to the search engine platform (block 510). By way of example, the portfolio optimization platform 104 deploys the low-impression keyword model 134 to generate the low-impression keyword bids 136 for submission to the search engine platform 106.

Figure 6:
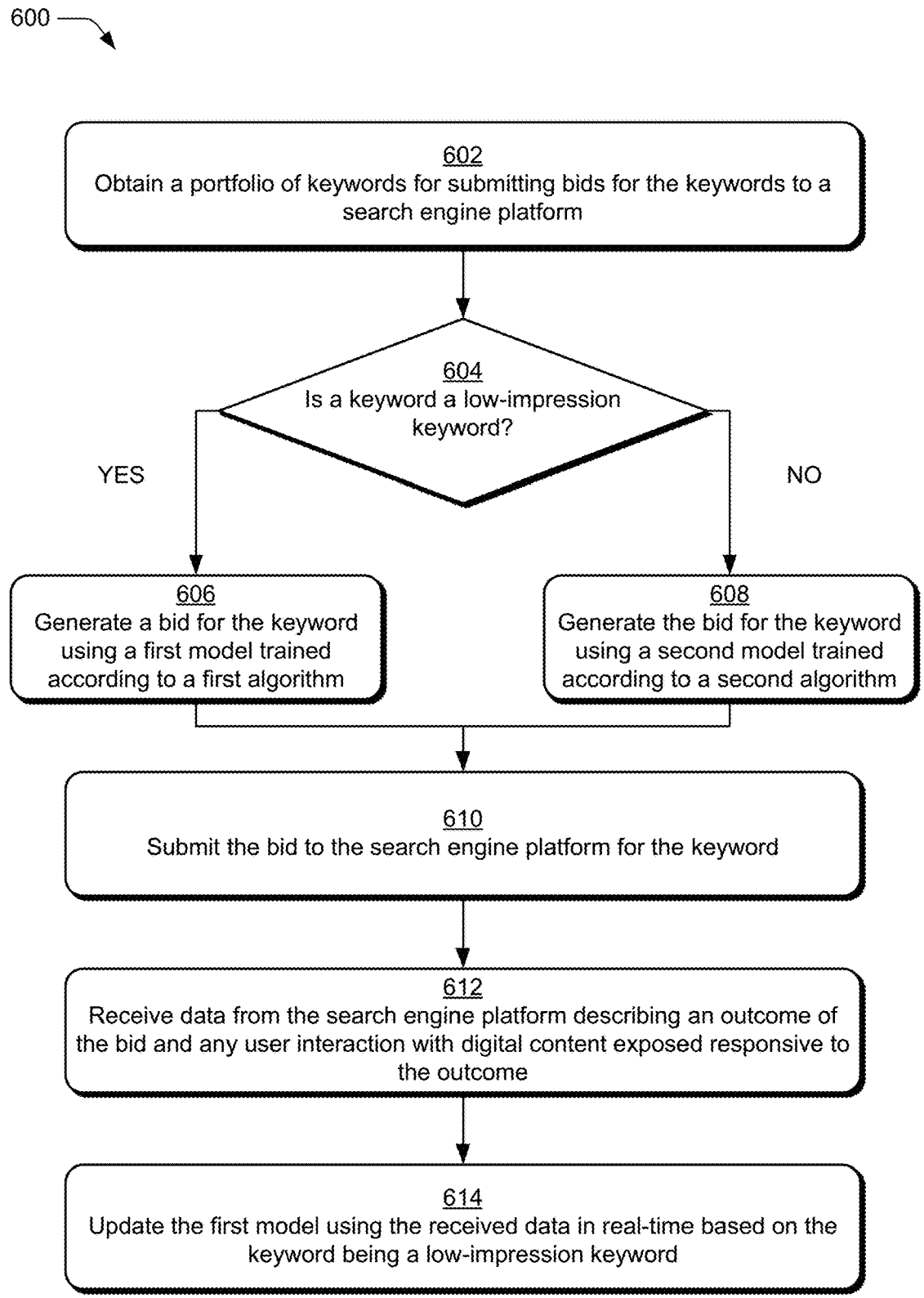
FIG. 6 depicts a procedure in an example implementation in which a bid for a keyword is generated by a low-impression keyword model and in which the bid as submitted to a search engine platform is constrained.

FIG. 6 depicts a procedure 600 in an example implementation in which a bid for a keyword is generated by a low-impression keyword model and in which the bid as submitted to a search engine platform is constrained.

A portfolio of keywords is obtained for submitting bids to a search engine platform (block 602). By way of example, the portfolio optimization platform 104 obtains the keyword portfolio 138 based on user input received via the user interface 404 to enter the keywords in the keyword entry component 406.

A determination is made regarding whether each of the keywords is a low-impression keyword (block 604). By way of example, the RL-based bidder 126 determines whether each of the keywords in the keyword portfolio 138 is a low-impression keyword.

If it is determined that a keyword is a low-impression keyword ("YES" at block 604), then a bid is generated for the keyword using a first model trained according to a first algorithm (block 606). By way of example, the RL-based bidder 126 determines at block 604 that a keyword is a low-impression keyword. Responsive to this, the RL-based bidder 126 uses the low-impression keyword model 134 to generate a bid for the keyword. In accordance with the described techniques, this generation includes generating the proposed bid 304 and applying the constraints 306 to the proposed bid 304 by the bid constraint system 128, e.g., based on an amount spent on keyword bidding over a previous time period. After the proposed bid 304 is suitably constrained, the RL-based bidder 126 generates the low-impression keyword bid 136 for submission to the search engine platform 106.

If it is determined that a keyword is not a low-impression keyword ("NO" at block 604), then the bid is generated for the keyword using a second model trained according to a second algorithm (block 608). By way of example, the RL-based bidder 126 determines at block 604 that a keyword is not a low-impression keyword. Responsive to this, the portfolio optimization platform 104 uses a different type of model (not shown) from the low-impression keyword model 134, e.g., a model suitable to generate bid predictions for primary keywords having non-sparse data, to generate a bid for the keyword.

The bid is submitted to the search engine platform for the keyword (block 610). By way of example, the RL-based bidder 126 submits the low-impression keyword bid 136 to the search engine platform 106 for the low-impression keyword. Alternately, a primary keyword bidder (not shown) submits the bid for a keyword that is determined not to be a low-impression keyword.

Data is received from the search engine platform describing an outcome of the bid and any user interaction with digital content exposed responsive to the outcome (block 612). By way of example, the portfolio optimization platform 104 receives the live demand data 302 from the search engine platform 106.

The first model is updated using the received data in real-time based on the keyword being a low-impression keyword (block 614). By way of example, the model trainer 212 updates the low-impression keyword model 134 in real-time using the live demand data 302 that corresponds to the low-impression keywords.

Having described example procedures in accordance with one or more implementations, consider now an example system and device that can be utilized to implement the various techniques described herein.

Example System and Device

Figure 7:
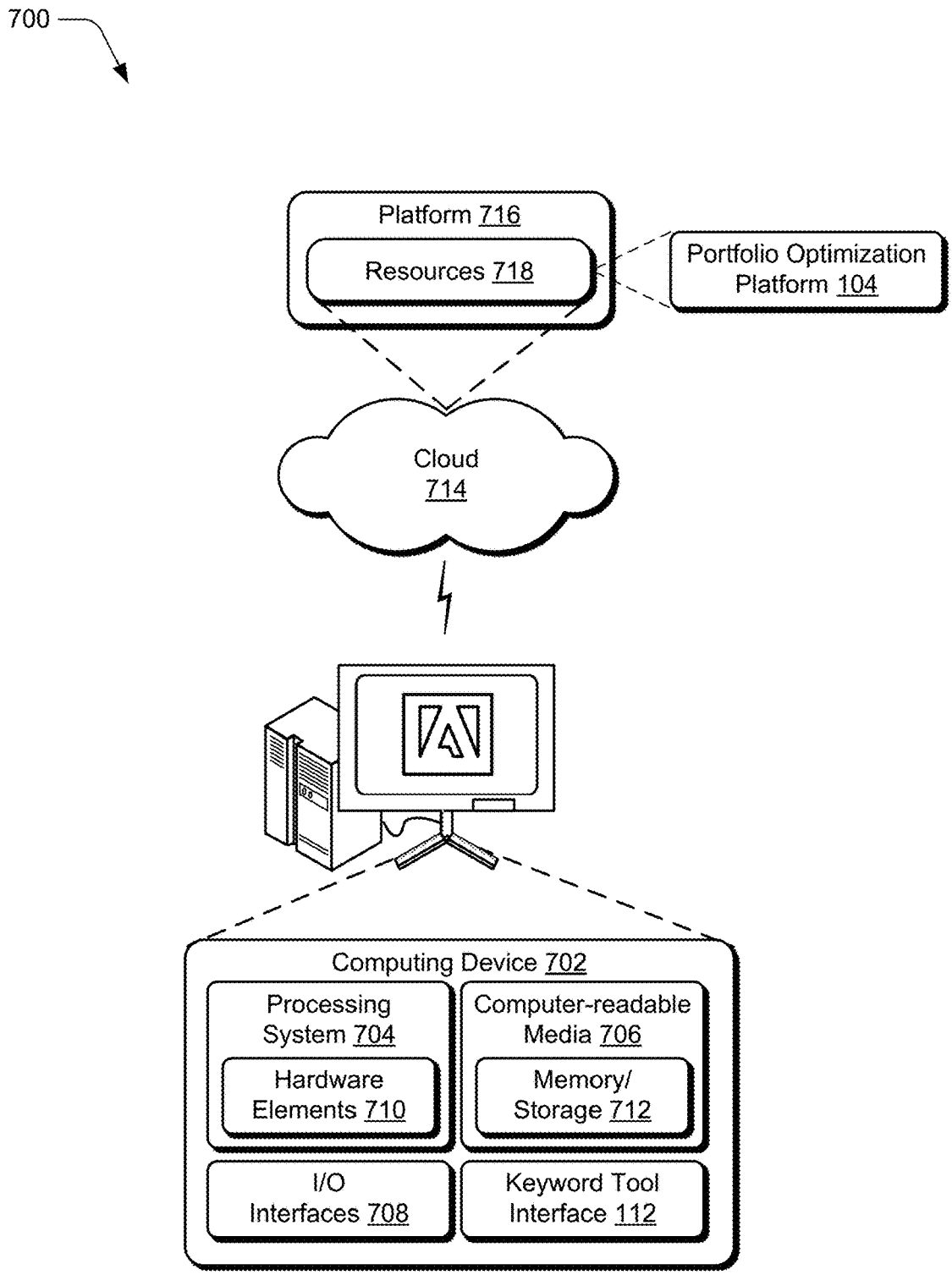
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the portfolio optimization platform 104 and the keyword tool interface 112. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the subject matter has been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
receiving, by a processing device, a portfolio of keywords including low-impression keywords from multiple client devices;
identifying, by the processing device, the low-impression keywords by determining which keywords of the portfolio of keywords are associated with an amount of user interaction with digital content that is below an interaction threshold;
generating, by the processing device, bids for the low-impression keywords using a model trained with an algorithm configured to train models based on data describing user interactions with the digital content and corresponding bids won for keywords and based on simulated winning training bids; and
submitting, by the processing device, the bids for the low-impression keywords to a search engine platform.

2. The method of claim 1, further comprising constraining the bids generated by the model based on an amount of budget allocated for the low-impression keywords of the portfolio.

3. The method of claim 2, wherein constraining the bids includes:
adjusting at least one of a maximum bid down or a maximum bid up based on an amount of the budget spent over a previous time period; and
generating additional bids for the low-impression keywords using the model, including multiplying the bids for the low-impression keywords by values in a range defined by the maximum bid down and the maximum bid up.

4. The method of claim 1, wherein the model is trained offline with a search engine simulator before being deployed for bid submission.

5. The method of claim 1, further comprising updating the model according to the algorithm in real-time as data describing outcomes is received from the search engine platform.

6. The method of claim 5, further comprising generating additional bids for the low-impression keywords using the model as updated.

7. The method of claim 6, wherein updating the model includes tuning at least one parameter of the model.

8. The method of claim 7, wherein the at least one parameter includes a parameter that defines a number of days' worth of data that the model uses to generate the bids and the additional bids.

9. The method of claim 7, wherein the at least one parameter includes a parameter that defines a learning rate for updating the model using the data describing outcomes.

10. A system comprising:
a reinforcement learning based bidder (RL-based bidder) implemented at least partially in hardware of at least one computing device to receive a portfolio of keywords including low-impression keywords from multiple client devices and to identify the low-impression keywords by determining which keywords of the portfolio of keywords are associated with an amount of user interaction with digital content that is below an interaction threshold; and
a machine learning model to generate bids for the low-impression keywords, the machine learning model trained with an algorithm configured to train models based on data describing user interactions with the digital content and corresponding bids won for keywords and based on simulated winning training bids.

11. The system of claim 10, wherein the algorithm is a temporal difference learning algorithm.

12. The system of claim 10, wherein the model is trained offline with a search engine simulator before being deployed for bid submission.

13. The system of claim 10, wherein the RL-based bidder is further configured to submit the bids for the low-impression keywords to a search engine platform.

14. The system of claim 13, further comprising a model trainer to update the model based on the algorithm, the model trainer configured to update the model, in part, by tuning one or more parameters of the model in real-time as data describing outcomes of submitting the bids for the low-impression keywords is received from the search engine platform.

15. The system of claim 10, further comprising a bid constraint system to constrain the bids generated by the model based on an amount of budget allocated for the low-impression keywords of the portfolio.

16. The system of claim 15, wherein constraining the bid constraint system includes:
adjusting at least one of a maximum bid down or a maximum bid up based on an amount of the budget spent over a previous time period; and
generating additional bids for the low-impression keywords using the model, including multiplying the bids for the low-impression keywords by values in a range defined by the maximum bid down and the maximum bid up.

17. A method comprising:
receiving, by a processing device, a portfolio of keywords including low-impression keywords from multiple client devices;
identifying, by the processing device, the low-impression keywords by determining which keywords of the portfolio of keywords are associated with an amount of user interaction with digital content that is below an interaction threshold;
training, by the processing device, a low-impression keyword model offline based on:
    training data that combines data describing events associated with bidding the low-impression keywords with semantic data for the low-impression keywords, including data describing user interactions with the digital content and corresponding bids won for keywords, and
    predictions based on simulated winning training bids generated by a search engine simulator responsive to receipt of training keyword bids produced by the low-impression keyword model based on the training data to simulate behavior of a search engine platform based on the received data; and
deploying, by the processing device, the low-impression keyword model as trained to generate bids for the low-impression keywords and submission to the search engine platform.

18. The method of claim 17, wherein the training includes tuning parameters of the low-impression keyword model according to a temporal difference learning algorithm and based on the predictions generated and the training keyword bids produced.

19. The method of claim 17, further comprising a bid constraint system to constrain the bids generated by the model based on an amount of budget allocated for the low-impression keywords of the portfolio.

20. The method of claim 19, wherein constraining the bid constraint system includes:
adjusting at least one of a maximum bid down or a maximum bid up based on an amount of the budget spent over a previous time period; and
generating additional bids for the low-impression keywords using the model, including multiplying the bids for the low-impression keywords by values in a range defined by the maximum bid down and the maximum bid up.

* * * * *